UNITED STATES PATENT OFFICE.

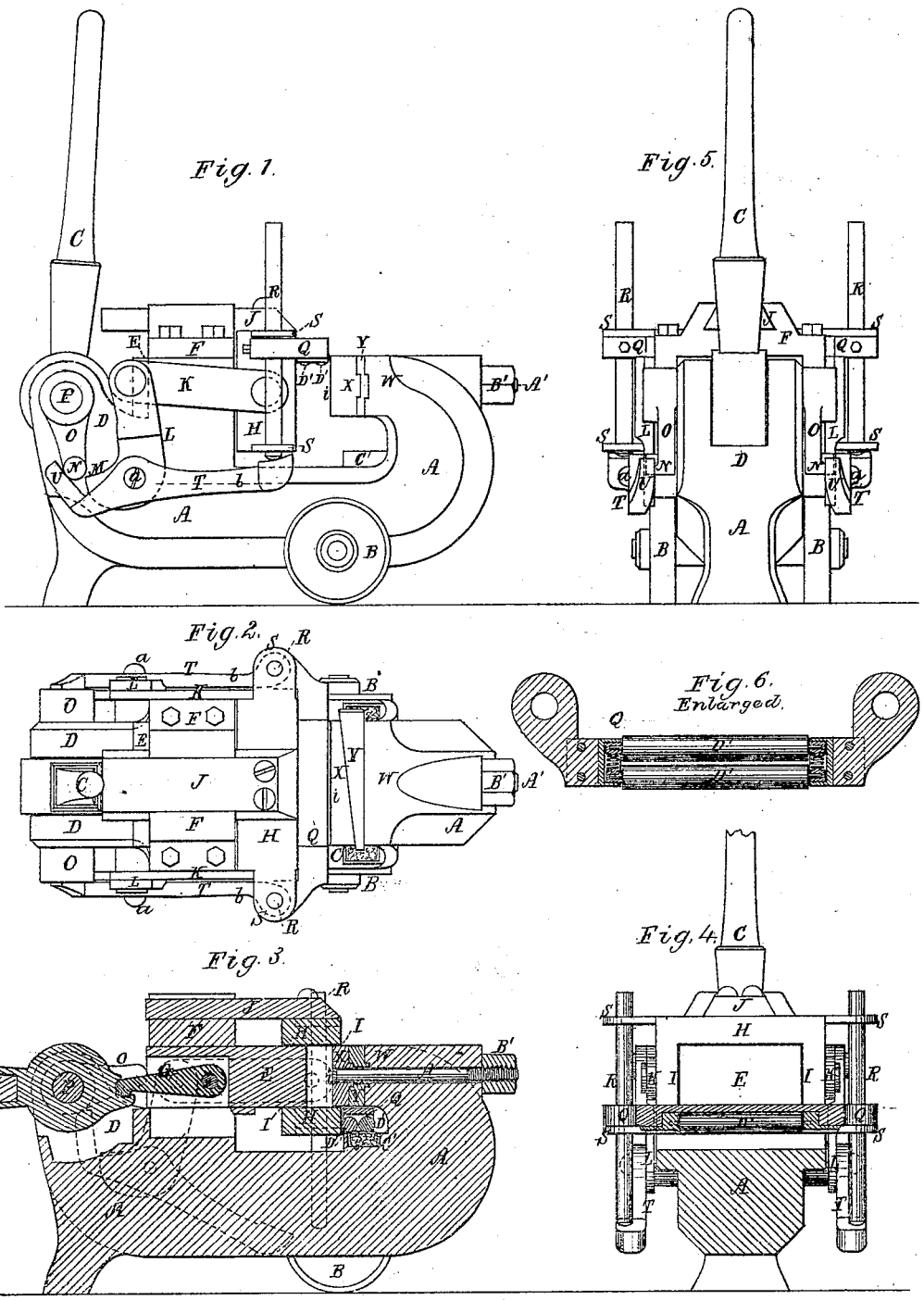

DAVID J. HUNTER, OF BOSTON, MASSACHUSETTS, ASSIGNOR TO ISAAC AMES, OF SAME PLACE.

IMPROVEMENT IN BRICK-MACHINES.

Specification forming part of Letters Patent No. 141,646, dated August 12, 1873; application filed June 26, 1873.

*To all whom it may concern:*

Be it known that I, DAVID J. HUNTER, of Boston, Suffolk county, Massachusetts, have invented certain Improvements in Brick-Machinery, of which the following is a specification:

This machine is designed to effect the secondary operation of molding or pressing bricks, by which they are converted into face-brick, the purpose of the invention being to provide a powerful, simple, and effective machine for this purpose.

The machine in question consists, first, of a horizontal plunger or male die, supported and guided in part by a stationary standard or bearing, and in part in and by a sliding mold or matrix or slotted beam, which encompasses it, and is properly supported in the frame of the machine; secondly, of the said mold or matrix, to which reciprocating movements in a horizontal plane are imparted by suitable mechanical means in such manner that the mold at times retreats and loses its character as a mold and at other times advances and constitutes a mold for reception of the brick to be pressed; third, of a horizontal carriage sliding in a vertical plane at right angles to the greatest plane of the plunger and immediately in front of the latter, this carriage being of a length greater than that of a brick, and of a width preferably about equal to that of a brick, and being supported by suitable guides in such manner as to travel in reciprocating movements past the front face of the plunger, carrying in its descent a brick and presenting such brick to the mouth of the mold, and in its ascent elevating the finished brick to a point from which it is readily removed; fourth, of an adjustable mold-bottom arranged in alignment with the axis of the plunger and mold, and of a size in vertical cross-section to correspond to that of the mold and plunger, both the plunger and mold sliding to and fro of this mold-bottom and of each other, as hereinafter stated, the purpose of the adjustable function of the mold-bottom being to accommodate varying thicknesses of bricks; fifth, of a lubricating vessel or reservoir and a quantity of lubricant, whereby the reciprocating carriage and adjacent parts of the machine are maintained in perfect working order and clogging and fouling prevented; sixth, of a peculiar organization of mechanical agents whereby the operation of the plunger, mold, and carriage are effected in a simple and powerful manner.

The working parts of this machine are mounted in or upon a substantial and solid carriage provided with wheels, whereby it may be readily trundled about from one hake to another, or to any locality desired, the lever which, as hereinafter explained, effects the operations of the machine serving as a handle whereby the machine is moved about.

The drawings accompanying this specification represent in Figure 1 a side elevation, in Fig. 2 a plan, in Fig. 3 a vertical, central, and longitudinal section, and in Fig. 4 a vertical and transverse section, of a machine embodying my invention, the latter figure being taken through the reciprocating carriage in its lowest position, and Fig. 3 also in its lowest position, but over the oil-reservoir, Fig. 1 being taken with the said carriage at its highest position and immediately in front of the plunger. Fig. 5 is a rear-end elevation of the machine. Fig. 6 is a horizontal section of the reciprocating carriage, for the purpose of exhibiting the arrangement of the anti-friction rollers attached to it and the manner of expanding such rollers.

In the above-named drawings, A represents a heavy block or carriage mounted at its forward end upon wheels B B by which it may be trundled about from one hake of bricks to another, and provided at rear with a long upright bar, C, which serves not only as a handle by which the machine may be moved about, but as a lever or prime mover to actuate the various parts of the machine, the said bar being fulcrumed to a furcated standard, D, erected upon the block A. E represents a rectangular oblong beam or plunger sliding horizontally within a standard, F, erected upon the block A and in front of the bar C, the said plunger or die having short reciprocating movements imparted to it in a horizontal plane by means of a latch or pawl, G, which is pivoted to its rear end, and operates in connection with the bar C and by a pair of jointed levers, as hereinafter explained, the pawl serving, in connection with the bar, to advance the die and compress the brick, and the levers serving, in connection with or at the hands of such bar, to retract the plunger and allow the brick to be elevated above the mold. In front of the standard F I dispose an upright slotted beam or block, H, the orifice I of such block being the mold of the machine, the mold thus obtained embracing and sliding upon the plunger, and being of a depth somewhat greater than that of a brick. The mold-block H is supported in part by the plunger, and more particularly by a dovetailed tongue, J, secured to its upper surface, which slides within a correspondingly-formed groove or channel created in the top of the standard F, while the alternating traverses of the mold-block to and fro of the plunger are effected in one direction, or rearward, by a double or jointed lever, K, one at each side of the machine, the lower and upright arm L of such lever being pivoted to the bed of the machine by a pivot, $a$, and formed with a nose, M, against which the pin N of a crank, O, wipes, such crank being secured to the outer end of the rock-shaft P, which constitutes the fulcrum of the bar C. Q in the accompanying drawings represents a horizontal bar or carriage disposed immediately in front of the plunger E and sliding to and fro of the same in a vertical plane, this carriage being supported in position by upright rods R R, which are attached to its opposite ends, and slide within ears S S, making part of the mold-block H. The carriage Q in its descent drops to a point immediately below the mold, and remains in this plane while advancing or retreating with the said mold, and the thickness of said carriage is about equal to or slightly greater than that of a brick. The traverses of the carriage Q are effected by a pair of levers, T T, disposed one at each side of the machine-bed A and fulcrumed upon the pivot $a$ of the lever K, the length and functional character of the levers K and T being such that, as the mold-block H and carriage Q reach their extreme rearward position, the actuating rods or guides R of the carriage Q are disposed over and coincide with the front end of the longer and horizontal arm $b$ of the lever T, it being seen, on reference to the accompanying drawings, that the pin N of the crank O, in addition to actuating each lever K, also actuates the lever T by wiping against an upright bend or nose, U, in which the rear arm of such lever terminates, the crank-pin operating, first, to wipe against the upright arm of the compound lever K and advance the mold-block; next, to return, and by wiping against the nose M of said upright arm to retract the mold-block; and, finally, by wiping against the nose U of the lever T to elevate the longer arm $b$ of said lever T and elevate the lever Q. The forward part of the machine-bed A rises into a solid abutment or post, W, and to the upper part of the inner face of this abutment I apply the mold-bottom X, which is a wedge, whose rear face is parallel to the mold-block and brick-carriage, a second wedge, Y, being interposed between the said mold-bottom X and the abutment W, and the two being confined securely in place by a spindle, A′, which is attached to the said bottom and extends outwardly through the wedge Y and abutment W, and is provided with a nut, B′, by which it is tightened or loosened, as the case may be. This adjustable manner of applying the mold-bottom enables me to adapt the machine to bricks of different sizes. Some little distance below the adjustable mold-bottom X, and immediately below the path of movement of the carriage Q, I dispose a tank or box, C′, for containing a quantity of oil or other suitable lubricating material, and I dispose within this box a quantity of cloth, webbing, or other material, which will absorb such lubricant and permit it to be readily taken up by the distributing-rollers attached to the bottom of the carriage Q. This absorbing material or band may be placed upon a metallic band stretched across the box, or it may be provided with a foundation placed upon springs, my purpose in this respect being to obtain a yielding action upon the material in order to insure the contact of the distributing-rollers with it under all conditions as they pass over it. These rollers, shown at D′ D′, are pivoted in a suitable manner to the under side or lower post of the carriage Q, and so as to project slightly beyond the sides; and the purpose of these rolls is to distribute about and upon the plunger and adjacent parts a certain amount of lubricating material, whereby the working of the machine is greatly aided.

In order that the rollers D′ may separate from or approach one another, according to the position of the mold-bottom, in adapting the machine to bricks of varying thicknesses, the bearings of these rollers should be applied to the mold-block so as to slide thereupon, and suitable springs should be interposed between said bearings in order to effect this object.

The above embraces substantially the construction of a machine which I intend shall carry out the purposes of my present invention, and its operation may be stated briefly as follows: Taking as a starting point the position of the various parts, as shown in Fig. 1 of the accompanying drawings—that is to say, with the carriage Q in its highest position above the mold, and its rods R R resting upon the arms $b$ of the levers T, the bar C in an upright position, and the pin N of the crank O abutting against the nose U of the lever T, the mold-block H at its extreme rearward position embracing the plunger E, and the front faces of the two flush with with each other, and the plunger at its extreme rearward position and with its pawl or latch G lying idle in front of the lower arm of the bar C—one attendant of the machine seizes a brick from the hake near him and deposits it edgewise upon the top of the carriage Q, and at the center thereof, a shallow depression or two marks being impressed upon the carriage to enable the attendant to place the brick at once in the proper place. Another attendant now seizes the bar C and lowers it to or about to a horizontal position, the first effect of this lowering of the bar being to lower the carriage and present the brick to the mouth of the mold-orifice in the mold-block, which orifice is at this time filled by the plunger; next, to advance the mold-block and open the mold, which embraces slightly the bottom X, and advance the carriage Q until it arrives over the oil-reservoir, the carriage as it advances leaving the brick, which is swallowed or inclosed by the mold; next, the plunger, by the action of the lower arm of the bar C upon the latch or pawl G, is advanced slightly, and compresses the brick between it and the mold-bottom X, and the operation of compressing the brick is completed. The operator in charge of the bar C now raises the latter, which continues to rise without effect upon the elements of the machine until it arrives at an angle of about thirty degrees with the horizon, when the pin N of the crank O wipes against the nose M of the lever K and retracts the mold-block H and carriage Q to their fullest extent, and immediately thereafter wipes against and lowers the arm U of the lever T, and elevates the carriage Q to its highest point, the plunger also retreating, and the brick, by the retreat of the mold-block, emerging from the mold and resting upon the carriage, and being raised with the latter in its ascent to its original position. The finished brick is now removed and a fresh one substituted, and the machine again goes through its functions.

As the rollers D' D' pass over the lubricating-tank C' they take up and distribute to the adjacent parts a certain amount of the lubricant therein, and this aids very greatly in the working of the machine, as the tenacious and adhesive nature of clay offers very great obstacles to the successful operation of the machine, which this lubrication obviates.

I claim—

1. In combination with the reciprocating mold, reciprocating plunger received and partly supported in said mold, and stationary mold-bottom, toward and away from which said mold and plunger move, as set forth, a carrier, reciprocating vertically, to take the brick from or deliver it to the mold, in accordance with the direction of its movement, and horizontally reciprocated in its lowest position to allow the mold to close upon the stationary bottom, said movements being timed with relation to those of the mold and plunger, substantially as shown and set forth.

2. The combination of a mold, reciprocating in a horizontal plane, and a carrier reciprocating in a vertical and horizontal plane, to lower a brick to the mouth of the mold, and subsequently receive and elevate the brick therefrom, substantially as and for the purposes stated.

3. The mold-bottom, composed of the two wedge-shaped pieces X Y, united by a connecting and tightening rod, A, and nut B', and adjustable one on the other, substantially as and for the purposes set forth.

4. The combination of the vertically-reciprocating carrier with the lubricating-chamber and devices whereby, during the movement of said carrier, the lubricant may be taken from said chamber and delivered to those parts with which the carrier is brought in contact, substantially as shown and set forth.

5. The rollers D' D', as combined with the carriage Q and chamber C'', substantially as and for the purposes stated.

6. The combination of the jointed levers K and T, crank O, and bar C, with carrier Q and mold H, said parts being constructed and arranged together for joint operation, substantially as and for the purposes stated.

7. The combination of crank O, pawl G, levers K T, and rod R, with plunger E, mold H, and carrier Q, under the arrangement and for operation as shown and set forth.

DAVID J. HUNTER.

Witnesses:
GEO. C. GILCHRIST,
W. E. BOARDMAN.